United States Patent
He et al.

(10) Patent No.: US 9,811,993 B2
(45) Date of Patent: Nov. 7, 2017

(54) VEHICLE OPERATOR IMPAIRMENT DETECTION SYSTEM AND METHOD

(71) Applicant: Wichita State University, Wichita, KS (US)

(72) Inventors: Jibo He, Wichita, KS (US); Zhiquan Ren, Beijing (CN)

(73) Assignee: Wichita State University, Wichita, KS (US)

( * ) Notice: Subject to any disclaimer, the term of this patent is extended or adjusted under 35 U.S.C. 154(b) by 0 days.

(21) Appl. No.: 15/137,449

(22) Filed: Apr. 25, 2016

(65) Prior Publication Data

US 2016/0314674 A1    Oct. 27, 2016

Related U.S. Application Data

(60) Provisional application No. 62/151,765, filed on Apr. 23, 2015.

(51) Int. Cl.
| | |
|---|---|
| *G08B 21/06* | (2006.01) |
| *G06F 1/16* | (2006.01) |
| *G08B 21/04* | (2006.01) |
| *G08B 25/08* | (2006.01) |

(52) U.S. Cl.
CPC ............ *G08B 21/06* (2013.01); *G06F 1/163* (2013.01); *G06F 1/1694* (2013.01); *G08B 21/0423* (2013.01); *G08B 21/0446* (2013.01); *G08B 21/0476* (2013.01); *G08B 25/08* (2013.01)

(58) Field of Classification Search
CPC ...................................... G08B 21/06
USPC ................ 340/669, 425.5, 441, 438, 439
See application file for complete search history.

(56) References Cited

U.S. PATENT DOCUMENTS

| | | | | |
|---|---|---|---|---|
| 2009/0244309 A1* | 10/2009 | Maison | ............ | G06K 9/00369 348/222.1 |
| 2011/0121976 A1* | 5/2011 | Johns | ............ | A61B 3/113 340/576 |
| 2013/0332024 A1* | 12/2013 | Garrett | ............ | G07C 5/008 701/29.4 |
| 2014/0210625 A1* | 7/2014 | Nemat-Nasser | ...... | B60K 28/066 340/575 |
| 2015/0158495 A1* | 6/2015 | Duncan | ............ | B60W 40/09 701/1 |
| 2015/0194035 A1* | 7/2015 | Akiva | ............ | B60Q 9/00 340/575 |

(Continued)

Primary Examiner — Kevin Kim
(74) *Attorney, Agent, or Firm* — HOVEY WILLIAMS LLP (57) ABSTRACT

An operator impairment detection system comprising a wearable mobile device including a frame for supporting the wearable mobile device on an operator's face, an accelerometer for sensing acceleration of the wearable mobile device, a proximity sensor configured to be aimed at an eye area of the operator when the operator is wearing the wearable mobile device for sensing the operator's eye closing and opening, and a processor configured to receive acceleration vector data and proximity vector data and run an application for determining when the operator's head nods or rotates and when the operator's eye blinks and for determining when the nod, rotation, and/or blink or combination of nods, rotations, and/or blinks constitutes an operator impairment event, the processor being configured to instruct the wearable mobile device to alert the operator when an impairment event is detected.

17 Claims, 6 Drawing Sheets

(56) References Cited

U.S. PATENT DOCUMENTS

2015/0239477 A1* 8/2015 Kitagawa ............... G01C 21/34
                                                        701/1
2016/0272217 A1* 9/2016 Kim ........................ G01S 19/13

* cited by examiner

VEHICLE OPERATOR IMPAIRMENT DETECTION SYSTEM AND METHOD

RELATED APPLICATIONS

This patent application is a non-provisional regular utility patent application and claims priority benefit with regard to all common subject matter of earlier-filed U.S. Provisional Patent Application Ser. No. 62/151,765, filed on Apr. 23, 2015, and entitled "VEHICLE OPERATOR IMPAIRMENT DETECTION SYSTEM AND METHOD". The identified earlier filed provisional patent application is hereby incorporated by reference in its entirety into the present application.

BACKGROUND

Operator drowsiness and fatigue are major factors in land vehicle and aviation accidents. Devices and applications have been developed for detecting drowsiness, fatigue, and other operator impairments and for alerting the operator of his impaired state. For example, smartphone applications for operator impairment detection use a camera installed in the operator's smartphone to monitor the operator's face for observing signs of operator impairment such as head nodding and eye blinking. The camera tracks facial features of the operator and performs steps to determine when the operator's head moves or nods. The camera also tracks the operator's eye and performs steps to determine when the operator's eye blinks by differentiating between the color of the operator's pupil and the operator's eyelid. The smartphone tracks the number and/or frequency of head nods and/or eye blinks to determine when the operator has become fatigued or drowsy. This approach has a number of drawbacks, however. For example, the smartphone camera does not catch every head nod and often has difficulty distinguishing between a head nod and a harmless head movement or a driving-related head movement. The smartphone camera also does not always detect eye blinks because some operators have light pupils, dark skin, or other facial differences resulting in difficulty determining whether the operator's eye is open or closed.

SUMMARY

The present invention solves the above-described problems and provides a distinct advance in the art of detecting vehicle operator impairment. More particularly, the present invention provides a system and method for detecting vehicle operating impairment and alerting the operator of the impairment via a wearable mobile device.

Embodiments of the present invention include a system for detecting impairment of a vehicle operator. The system comprises a wearable mobile device including a frame for supporting the wearable mobile device on the operator's head, a power source for powering electronic components of the wearable mobile device, an accelerometer for sensing acceleration of the wearable mobile device and for generating acceleration vector data, and a processor configured to receive acceleration vector data from the accelerometer and to determine impaired operator events based on such acceleration vector data. The processor is configured to instruct the wearable mobile device to generate an alert when an impaired operator event is detected.

Embodiments of the present invention include an additional system for detecting impairment of a vehicle operator. The system comprises a wearable mobile device including a frame for supporting the wearable mobile device on the operator's head, a power source for powering electronic components of the wearable mobile device, a proximity sensor configured to be directed at an eye area of the operator when the operator is wearing the wearable mobile device and to generate proximity vector data corresponding to the operator's eye closing and opening, and a processor configured to receive proximity vector data from the proximity sensor and to determine impaired operator events based on such proximity vector data. The processor is configured to instruct the wearable mobile device to generate an alert when an impairment event is detected.

Embodiments of the present invention also include a method of detecting impairment of a vehicle operator. The method includes placing a wearable mobile device on the operator's head. The wearable mobile device may include a frame for supporting the wearable mobile device on the operator's head, a power source for powering electronic components of the wearable mobile device, an accelerometer for sensing acceleration of the wearable mobile device and for generating acceleration vector data, a proximity sensor configured to be directed at an eye area of the operator when the operator is wearing the wearable mobile device and to generate proximity vector data corresponding to the operator's eye closing and opening, a memory for storing the accelerometer vector data and proximity vector data, and a processor for analyzing the accelerometer vector data and proximity vector data.

Operator impairment monitoring may then be initiated via the wearable mobile device. Accelerometer vector data may be obtained via the accelerometer and proximity vector data may be obtained via the proximity sensor. The accelerometer vector data and proximity vector data may be stored on the memory. Impaired operator events may be determined based on the acceleration vector data and proximity vector data. An alert may then be generated when on impairment event is detected for alerting the operator that he may be operating the vehicle in an impaired state.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
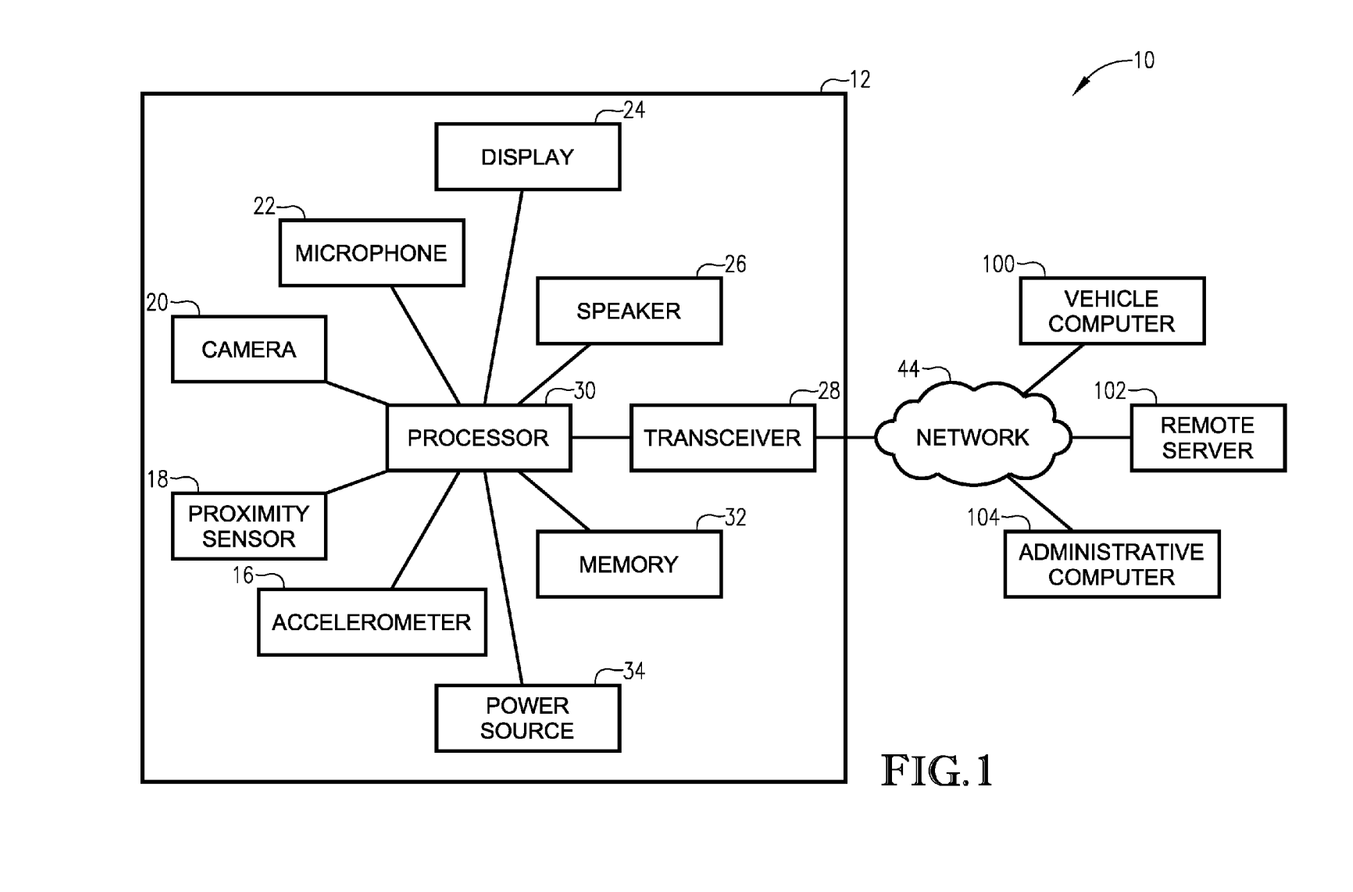
FIG. 1 is a schematic view of an operator impairment detection system including a wearable mobile device and constructed in accordance with an embodiment of the present invention.
Figure 2:
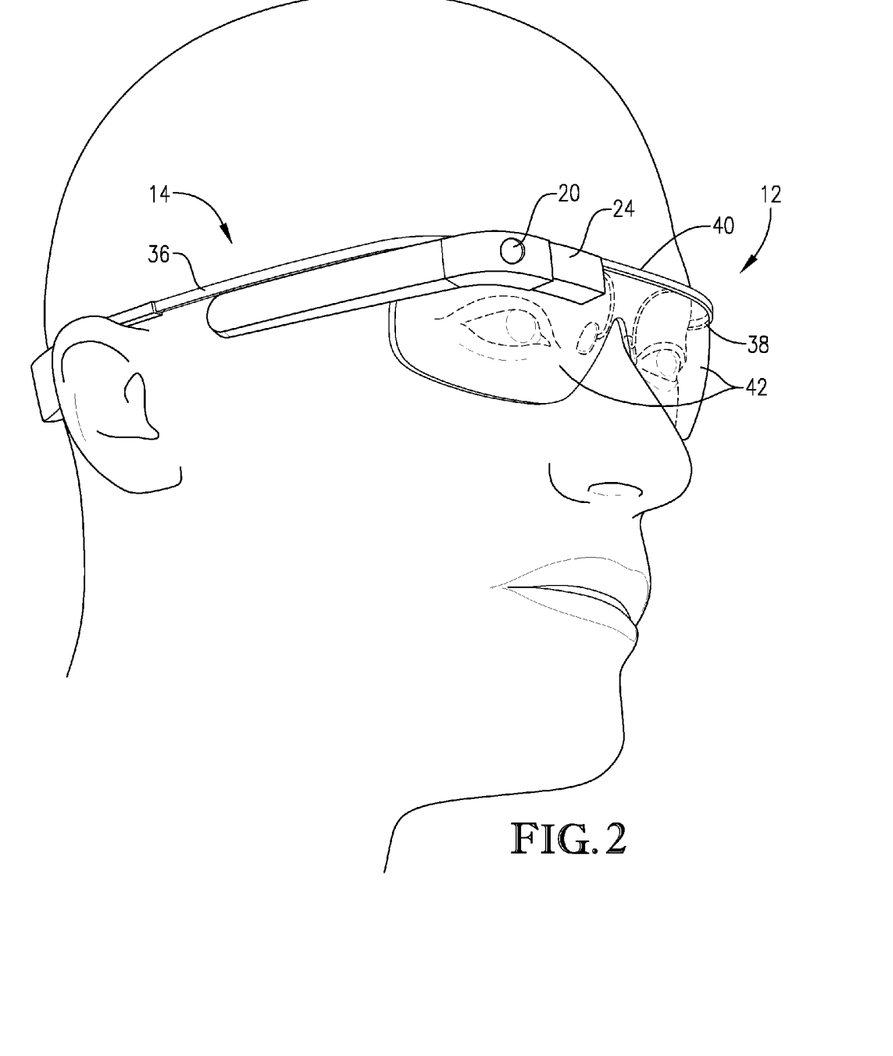
FIG. 2 is a perspective view of an operator wearing the wearable mobile device of the system of FIG. 1.

Turning now to FIGS. 1 and 2, a vehicle operator impairment monitoring system 10 constructed in accordance with an embodiment of the present invention is illustrated. The vehicle operator impairment monitoring system 10 (hereinafter "system 10") broadly comprises a wearable mobile device 12 including a frame 14, an accelerometer 16, a proximity sensor 18, a camera 20, a microphone 22, a display 24, a speaker 26 a transceiver 28, a processor 30, a memory 32, a power source 34, and other computing components.

The wearable mobile device 12 may be a Google Glass™, Meta™ Pro, Vuzix® Smart Glasses, Optinvent™ Ora-S AR™ glasses, Recon Jet™ glasses, GlassUp™, Epiphany Eyewear™, Telepathy On™, Sony® Glass, Samsung® Glass, Looxcie™ LX2 Wearable Video Cam, a webcam, computer goggles, or any other device that is worn on or near the operator's head. The wearable mobile device 12 (or another computing device) may run an application for monitoring the impairment of the operator, as described below.

The frame 14 allows the first wearable mobile device 12 to be donned on the operator's head and may include left and right members 36, 38 for supporting the first wearable mobile device 12 on the operator's ears and a bridge 40 for supporting the frame 14 on the operator's nose, as best shown in FIG. 2. The frame 14 may also include transparent lenses 42. The lenses 42 may be prescription lenses, generic corrective lenses, bifocals, trifocals, sunglass lenses, or non-altered lenses.

The accelerometer 16 is mounted in or on the wearable mobile device 12 and detects acceleration of the wearable mobile device 12 in three dimensions (x, y, and z). The accelerometer 16 may be a piezoelectric, piezoresistive, capacitive, and/or micro electro-mechanical system (MEMS) and may be sampled at over 100 Hz for extremely accurate measurements.

The proximity sensor 18 is mounted in or on the wearable mobile device 12 and is positioned to detect nearby objects such as the operator's eyes and eyelids. The proximity sensor 18 may be an infrared pulse sensor such as a LiteON LTR-506ALS, a camera, or similar sensor. Parameters of the proximity sensor 18 such as the infrared pulse frequency, pulse count, pull rate, and sensing thresholds may be modified. The proximity sensor 18 may be sampled at over 100 Hz for extremely accurate measurements.

The camera 20 records visual information and may be a still-frame camera or video recording device. The camera 20 may be mounted on the frame 14 near the operator's eye for capturing video and/or images from the operator's point of view.

The microphone 22 records audio information and may be mono, stereo, and/or directional. The microphone 22 may be positioned close to the camera 20 to record audio that matches up with the recorded video.

The display 24 allows the operator to view displayed information within the operator's view and may be a transparent lens or small screen extending from the frame 14 into the operator's view. The display 24 may also present visual alerts, notifications, warnings, and other communications to the operator when the processor 30 determines that an operator impairment event has occurred.

The speaker 26 allows the operator to hear audio information and may be mounted near the display 24 or near one of the members 36, 38 of the frame 14 for being close to the operator's ear when the operator is wearing the wearable mobile device 12. The speaker 26 may present audio alerts, notifications, warnings, and other communications to the operator when the processor 30 determines that an operator impairment event has occurred.

The transceiver 28 may be an antenna, wire connection, or any other electronic component for transmitting and receiving external signals between the wearable mobile device and other computing devices via a communication network (described below).

The processor 30 may comprise any number and combination of processors, controllers, integrated circuits, programmable logic devices, or other data and signal processing devices for carrying out the functions described herein, and may additionally comprise one or more memory storage devices, transceivers, receivers, and/or communication busses for communicating with the various devices of the system.

The processor 30 may implement the application (described in more detail below) or other computer program to perform some of the functions described herein. The application may comprise a listing of executable instructions for implementing logical functions in the user device. The application can be embodied in any computer readable medium for use by or in connection with an instruction execution system, apparatus, or device, and execute the instructions including the wearable mobile device 12. The various actions and calculations described herein as being performed by or using the application may actually be performed by one or more computers, processors, or other computational devices, independently or cooperatively executing portions of the application.

The memory 32 may be any computer-readable medium that can contain, store, communicate, propagate, or transport the application for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The power source 34 may be a battery, battery pack, or connectable cord for plugging the first wearable mobile device 12 into a wall outlet, vehicle power outlet, or auxiliary electronic device.

With reference to FIG. 1, the wearable mobile device 12 may communicate with a vehicle computer 100, remote server 102, administrative computer 104, and/or other computing devices over a wired or wireless network 44 such as the Internet, an intranet, "wifi" connection, or 3G, 4G, near field communication (NFC) technology, Bluetooth®, hotspot, direct wifi, HDMI, or similar communications networks.

Figure 3:
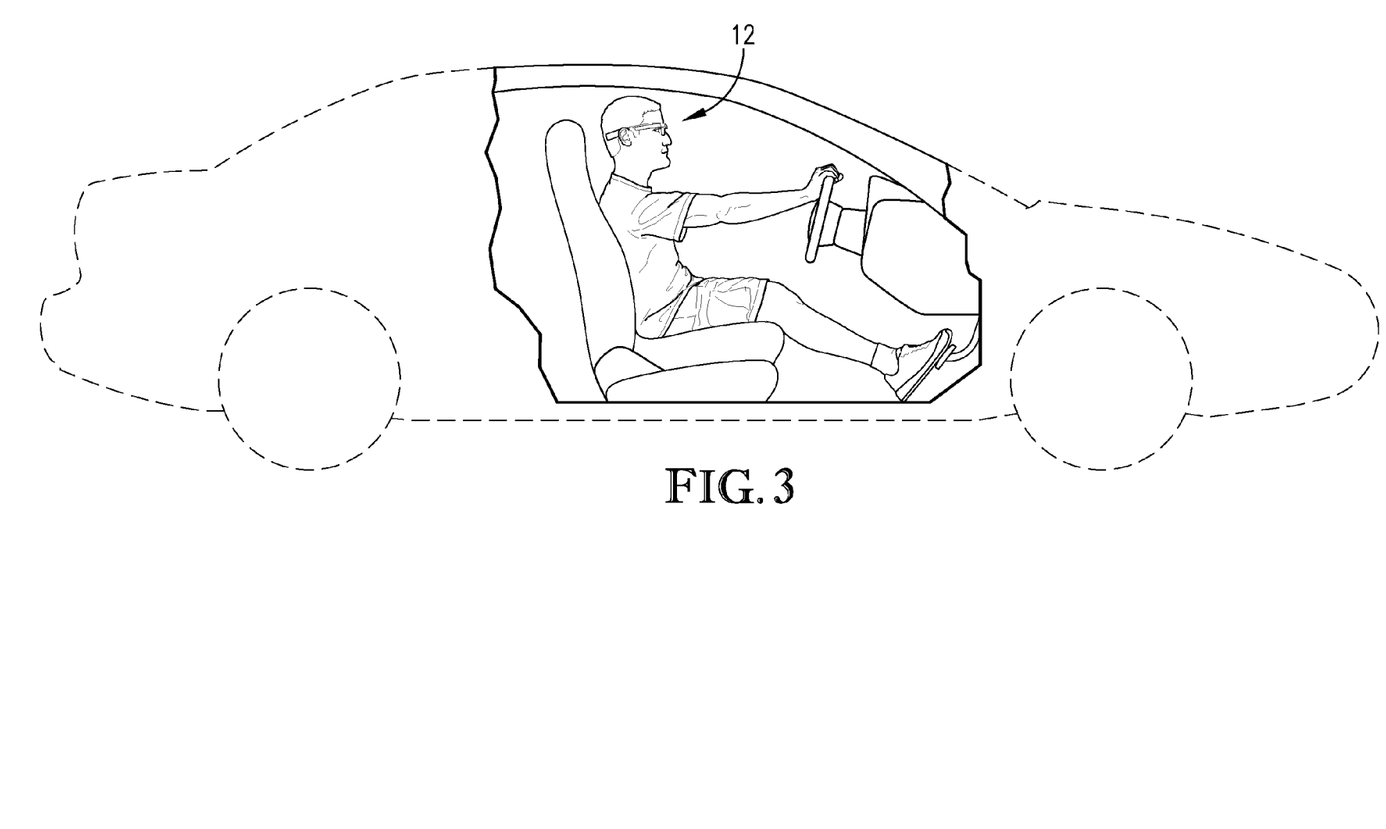
FIG. 3 is an environmental view of an operator wearing the wearable mobile device of FIG. 2 and using the system of FIG. 1 while driving a vehicle.
Figure 4:
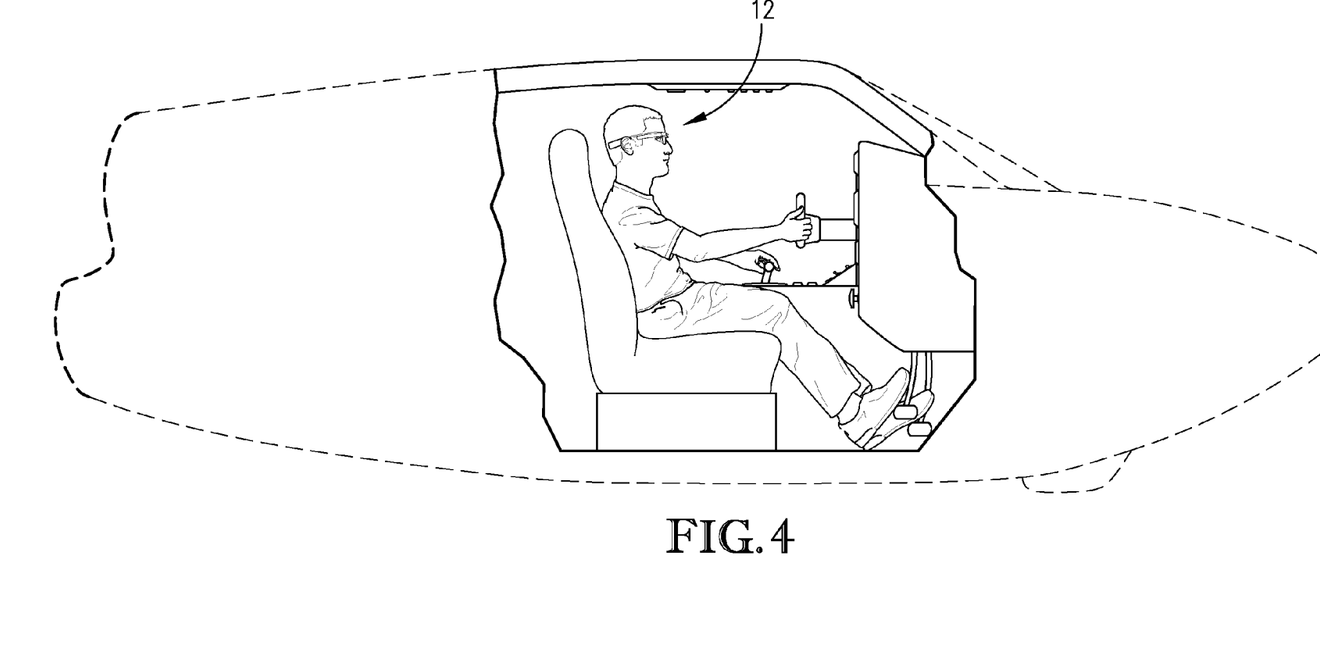
FIG. 4 is another environmental view of an operator wearing the wearable mobile device of FIG. 2 and using the system of FIG. 1 while piloting an aircraft.

As illustrated in FIGS. 3 and 4, embodiments of the present invention may be used by an operator of a vehicle for purposes of monitoring operator impairments and for providing alerts to the operator in the even that such an impairment is detected. For instance, an operator may use the system 10 while operating a ground vehicle such as a car, tractor trailer or other commercial vehicle, agricultural implement, aircraft, spacecraft, boat, submarine, or any other vehicle. The operator may also use the system 10 while performing stationary tasks such as operating a computer, performing guard duty, or any other task.

Turning to FIGS. 5-8, the application will now be described in more detail. The application performs steps to monitor operator impairments such as fatigue, drowsiness, distraction, and other operator impairments. The application operates in two stages: sensor data retrieval (block 200 of FIG. 5) and event detection (blocks 202, 204, 206, 208, 210, and 212). In sensor data retrieval, the application collects data representing accelerometer vectors in three axes of length T: $(a_{x1}, a_{x2}, \ldots, a_{xR})$, $(a_{y1}, a_{y2}, \ldots, a_{yT})$, and $(a_{z1}, a_{z2}, \ldots, a_{zT})$ from the accelerometer 16. The application receives vector values representative of an acceleration in the x axis when the accelerometer 16 moves sideways left or right due to the operator's head rotating. The application receives vector values representative of an acceleration in the y axis when the accelerometer 16 moves upwards or downwards due to the operator's head nodding. The application receives vector values representative of an acceleration in the z axis when the accelerometer 16 moves forwards or backwards. The application also collects data representing a proximity vector of length T: $(p_1, p_2, \ldots, p_T)$ from the proximity sensor 18. The application receives vector values representative of the proximity change when the proximity sensor 18 senses a change in proximity of the operator's eye area due to the operator's eye blinking. The application temporarily or permanently stores the accelerometer vector data and the proximity sensor data in a log file in the memory 32 of the wearable mobile device 12 for analysis in the event detection stage, as described below.

Figure 6:
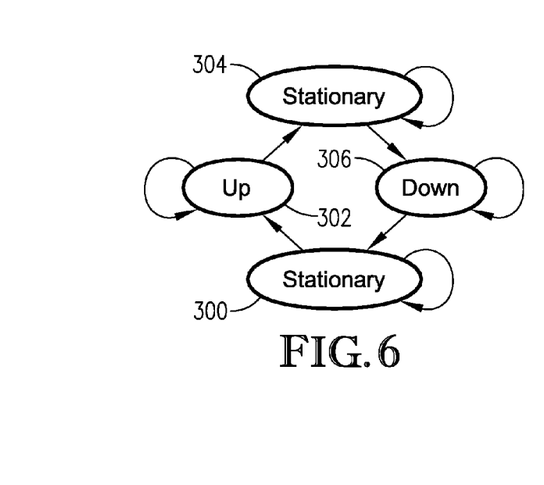
FIG. 6 is a flow chart of a vehicle operator impairment event.
Figure 7:
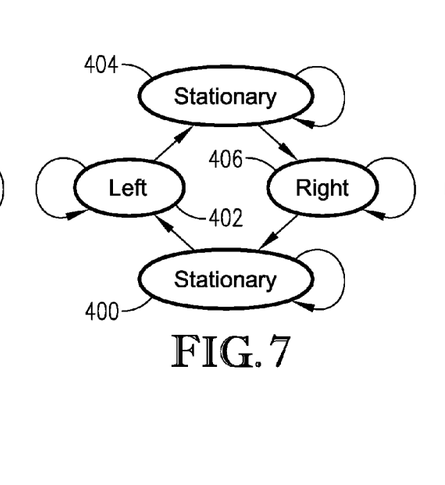
FIG. 7 is a flow chart of another vehicle operator impairment event.
Figure 8:
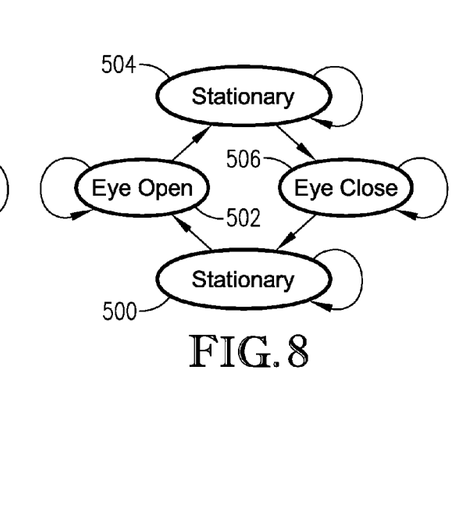
FIG. 8 is a flow chart of another vehicle operator impairment event.

In the event detection stage, the application analyzes the accelerometer vector data, the proximity sensor data, and other data to determine when an impaired operator event has occurred. Impaired operator events may include head nods, head rotations, eye blinks, and other actions. The impaired operator events comprise a number of stationary states and transitional states, as shown in FIGS. 6-8. For example, head nods comprise stationary states and up and down transitional states. Head rotations comprise stationary states and left and right transitional states. Eye blinks comprise stationary states and opening and closing transitional states. These states generate output observable data such as the accelerometer and proximity sensor vector values described above. The application uses statistical models such as Hidden Markov Models (HMM) to indirectly observe the states and thus detect the impaired operator events.

Figure 5:
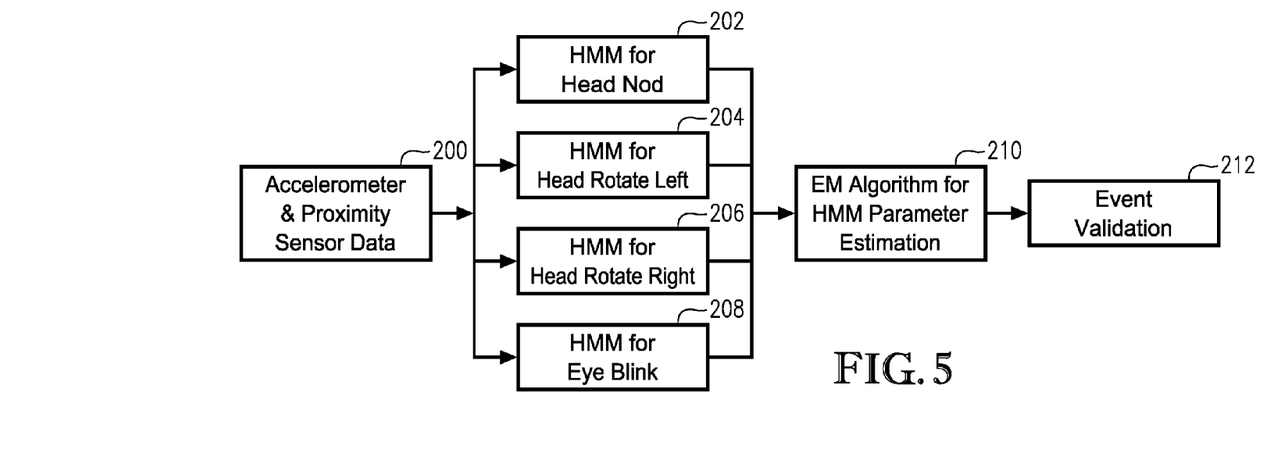
FIG. 5 is a flow chart of steps performed by an application run by the system of FIG. 1.

The application may run one or more HMMs for observing the states of the impaired operator events. For example, the application may run one HMM for observing head nod states (block 202), one HMM for detecting left rotation states (block 204), one HMM for detecting right rotation states (block 206), and one HMM for detecting eye blink states (block 208).

Head nods comprise stationary states and up and down transition states, as shown in FIG. 6. A head nod may begin with a first stationary state (i.e., the head of the operator staying relatively motionless in the vertical axis), as shown in block 300. The first stationary state may be followed by a first transition state (corresponding to the head of the operator beginning to move upward), as shown in block 302. The relative change of accelerometer values as described below may indicate the occurrence of a transition state. The transition state may be followed by a second stationary state (even if very briefly), as shown in block 304. The second stationary head nod state may then be followed by a second transition state (corresponding to the head of the operator beginning to move downward), as shown in block 306. The relative change of accelerometer values as described below may indicate the occurrence of another transition state. The second transition state 306 may then be followed by another stationary state from which the above pattern repeats if the operator continues to nod his head or from which the stationary head nod state continues if the operator does not continue nodding his head. It will be understood that the first head nod transition state 302 may be a downward head nod and the second head nod transition state 306 may be an upward head nod.

The head nod HMM uses the following relation for observing head nod transition states: a relative change of accelerometer values in the y axis compared to a change in accelerometer values in the x axis may indicate a head nod transition state, as expressed in the following inequality: $|\alpha_{yt} - \alpha_{y(t-1)}| \gg |\alpha_{xt} - \alpha_{x(t-1)}|$. That is, a head nod transition may have occurred if a change of acceleration in the y axis is much greater than a change in acceleration in the x axis for a given period of time (e.g., time t−1 to time t). Although an upward head nod will generate an acceleration value with an opposite sign of an acceleration generated by a downward head nod, the absolute value function causes the terms in the inequality to have positive signs regardless of the direction of the head nod.

Head left rotations comprise stationary states and transition head rotation states, as shown in FIG. 7. A left head rotation may begin with a first stationary state (i.e., the head of the operator staying relatively motionless in the horizontal axis), as shown in block 400. The first stationary state may be followed by a transition state (corresponding to the head of the operator beginning to move left), as shown in block 402. The relative change of accelerometer values as described below may indicate the occurrence of a transition state. The head left transition state 402 may then be followed by a second stationary state (even if very briefly), as shown in block 404. The second stationary head rotation state 404 may then be followed by a head right transition state 406, which the head right HMM may detect as described below, followed by another stationary state. The above pattern may repeat if the operator continues rotating his head left and right or the stationary state may continue if the operator does not continue rotating his head left and right.

The head left HMM uses the following relation for detecting head rotation transition states: a relative change of accelerometer values in the x axis compared to a change in accelerometer values in the y axis may indicate a head rotation, as expressed in the following inequality: $|\alpha_{xt}-\alpha_{x(t-1)}|>>|\alpha_{yt}-\alpha_{y(t-1)}|$. That is, a head rotation may have occurred if a change of acceleration in the x axis is much greater than a change in acceleration in the y axis for a given period of time (e.g., time t−1 to time t). Although a head rotation to the left will generate an acceleration value with an opposite sign of an acceleration generated by a head rotation to the right, the absolute value function causes the terms in the inequality to have positive signs regardless of the direction of the head rotation.

Head right rotations comprise stationary states and transition head rotation states, as shown in FIG. 7. A right head rotation may begin with a first stationary state (i.e., head of the operator staying relatively motionless in the horizontal axis), as shown in block 404. The first stationary state may be followed by a transition state (corresponding to the head of the operator beginning to move right), as shown in block 406. The relative change of accelerometer values as described below may indicate the occurrence of a transition state. The head right transition state 406 may then be followed by a second stationary state (even if very briefly), as shown in block 400 and described above. The second stationary head rotation state 400 may then be followed by a head left transition state 402, which the head left HMM may detect as described above, followed by another stationary state. The above pattern may repeat if the operator continues rotating his head left and right or the stationary state may continue if the operator does not continue rotating his head left and right. The head right HMM uses the same relation as the head left HMM (described above). It will be understood that the head left rotation and head right rotation detection HMMs may be combined into a single HMM.

Eye blinks comprise stationary states and opening and closing states, as shown in FIG. 8. An eye blink may begin with a first stationary state (i.e., the eyelid of the operator staying relatively open and motionless), as shown in block 500. The first stationary state may be followed by a first transition state (corresponding to the eye of the operator closing), as shown in block 502. The relative change of proximity values as described below may indicate the occurrence of a transition state. The first transition state 502 may then be followed by a second stationary state corresponding to the eyelid of the operator being closed (even if very briefly), as shown in block 504. The second stationary state 504 may then be followed by a second transition state (corresponding to the eye of the operator opening), as shown in block 506. The second transition state 506 may then be followed by another stationary state from which the above pattern repeats if the operator continues to blink or from which the stationary state continues if the operator does not continue to blink.

The eye blink HMM uses the following relation for detecting eye blinks: a change of proximity sensor values greater than a threshold 8 may indicate an eye blink, as expressed in the following inequality: $|p_t-p_{(t-1)}|>>\theta$. That is, an eye blink may have occurred if a change of proximity sensor values is much greater than a predetermined threshold for a given period of time (e.g., time t−1 to time t).

The application may also run an expectation maximization steps to estimate suitable parameters for the HMMs (block 210 of FIG. 5). The expectation maximization steps may determine that certain parameters may result in a higher percentage of observed impaired operator event states. The parameters may also be modified to reduce the number of erroneous observed impaired operator event states.

The application may also perform additional steps to determine whether an operator impairment event or combination of operator impairment events warrants alerting the operator of actual operator impairment (block 212). For example, the application may determine that a small number of eye blinks may not constitute actual operator impairment but frequency of eye blinks over a predetermined threshold may constitute actual operator impairment.

Operation of the system 10 will now be described in more detail. The operator places the wearable mobile device 12 on his head (block 600 of FIG. 9) while operating the vehicle or performing the task and initiates operator impairment monitoring by providing a predetermined input to the wearable mobile device 12 (block 602) such as tapping on a stem or frame 14 of the wearable mobile device 12 or speaking a specific command into the microphone 22. For example, the operator may say "Okay, Glass. Keep me awake." into the microphone 22. The application will then begin tracking and recording accelerometer vector data and proximity vector data (blocks 604 and 606) and running the HMM models (block 608) as described above. The application may append time stamps to the data to mark operator impairment events, as shown in block 610.

Figure 9:
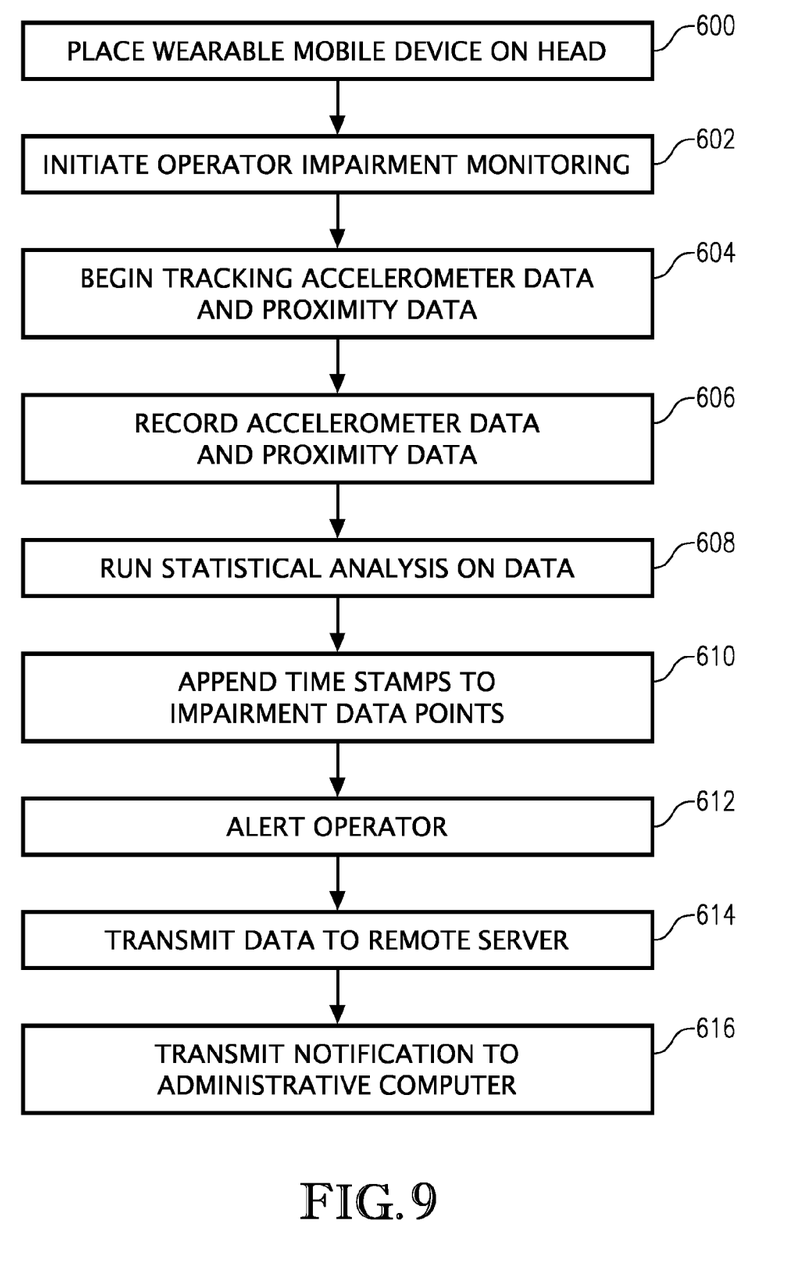
FIG. 9 is a flowchart of a method for using the system of FIG. 1, according to embodiments of the present invention.

The application alerts the operator with one or more warnings or notifications such as a light pattern, image, audio alert, verbal warning, vibration, or other stimulation when the application determines that an impaired operator event has occurred, as shown in block 612. For example, the application may instruct the speaker 26 to make a beeping sound or play an audio file such as a recorded voice saying "You may need to take a break from driving". The application may instead turn on a light on the wearable mobile device 12 or instruct the vehicle computer 102 to turn on a light on the vehicle dashboard or heads-up-display (HUD) such as a flashing light or a symbol shaped like a warning sign via the network 44 or other communication channel. Alternatively, the application may instruct the wearable mobile device 12 to vibrate or display a warning image on the display 24 of the wearable mobile device 12.

The application may transmit the accelerometer vector data, proximity vector data, time stamps, and other data to the remote server via the transceiver 28 over the network 44 for future reference, as shown in block 614. This allows the accelerometer vector data and proximity vector data to be used for insurance purposes, employee records, auditing, and accident evidence.

The application may also transmit a notification to the remote server 102 or an administrative computer 104 via the transceiver 28 over the network 44 to alert the administrator that the operator may be operating the vehicle while impaired (block 616). For example, the application may transmit a message listing the vehicle, the operator, the location of the vehicle, the speed and/or heading of the vehicle, the type of impairment detected, and/or the type of alert given to the operator to the administrative computer 104.

The application may receive inputs from the operator, the remote administrator, or internal calculations for modifying the steps performed by the application, the HMMs, and/or any parameters used by the application. For example, the particular magnitude of relative changes and particular threshold 8 required to assert the occurrence of impaired operator event states may be modified for more accurately detecting the states.

The above-described system 10 provides several advantages over conventional systems. For example, the system 10 uses accelerometer vector data from the accelerometer 16 to determine when the operator's head is nodding or rotating. This provides more accurate results than camera-based head nod and head rotation detection. The system 10 also uses proximity vector data from the proximity sensor 18 to determine when the operator blinks. This provides more accurate results than camera based eye blink detection. The system 10 also eliminates the setup required for properly aiming the smartphone camera by using a wearable mobile device that the operator simply wears on his or her head.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for detecting impairment of a vehicle operator, the system comprising:
    a wearable mobile device including:
        a frame for supporting the wearable mobile device on the operator's head;
        a power source for powering electronic components of the wearable mobile device;
        an accelerometer for sensing acceleration of the wearable mobile device and for generating acceleration vector data; and
        a processor configured to receive acceleration vector data from the accelerometer and to determine impaired operator events based on such acceleration vector data,
        wherein the processor is configured to instruct the wearable mobile device to generate an alert when an impaired operator event is detected, and
        wherein the processor is further configured to receive inputs from the operator for altering parameters used in determining whether an impaired operator event constitutes actual operator impairment.

2. The system of claim 1, wherein the accelerometer is configured to detect acceleration in a first direction corresponding to the operator's head rotating or moving horizontally, acceleration in a second direction corresponding to the operator's head nodding, and acceleration in a third direction corresponding to the operator's head moving forwards and backwards.

3. The system of claim 2, wherein the processor is configured to detect a head nod as a series of stationary states and transitional up and down states between the stationary states.

4. The system of claim 2, wherein the processor is configured to detect a head rotation as a series of stationary states, and transitional left and transitional right states between the stationary states.

5. The system of claim 2, wherein the processor is configured to generate Hidden Markov Models to indirectly detect head rotations and head nods.

6. The system of claim 5, wherein the processor is configured to generate a first Hidden Markov Model for detecting head rotations and a second Hidden Markov Model for detecting head nods.

7. The system of claim 1, wherein the processor is further configured to determine whether detected impaired operator events warrant generating an alert for warning the operator of the actual operator impairment.

8. The system of claim 1, wherein the processor is further configured to generate time stamps indicating times at which impaired operator events occur.

9. The system of claim 8, further comprising a transceiver, wherein the processor is further configured to transmit accelerometer vector data and the time stamps corresponding to the impaired operator events to a remote server over a wireless network via the transceiver.

10. The system of claim 1, further comprising a transceiver, wherein the processor is further configured to generate an impairment notification and transmit the notification to the remote server over the wireless network for alerting an administrator that the operator may be operating the vehicle while impaired.

11. A system for detecting impairment of a vehicle operator, the system comprising:
    a wearable mobile device including:
        a frame for supporting the wearable mobile device on the operator's head;
        a power source for powering electronic components of the wearable mobile device;
        a proximity sensor configured to be directed at an eye area of the operator when the operator is wearing the wearable mobile device and to generate proximity vector data corresponding to the operator's eye closing and opening; and
        a processor configured to receive proximity vector data from the proximity sensor and to determine impaired operator events based on such proximity vector data,
        wherein the processor is configured to instruct the wearable mobile device to generate an alert when an impairment event is detected, and
        wherein the processor is further configured to receive inputs from the operator for altering parameters used in determining whether an impaired operator event or collection of impaired operator events constitutes actual operator impairment.

12. The system of claim 11, wherein the processor is configured to generate a Hidden Markov Model to indirectly detect eye blinks.

13. The system of claim 11, wherein the processor is further configured to determine whether detected impaired operator events warrant generating an alert for warning the operator of the actual operator impairment based on a predetermined factor.

14. The system of claim 13, wherein the processor is configured to determine a frequency of eye blinks over a predetermined threshold to constitute the actual operator impairment.

15. The system of claim 11, wherein the processor is further configured to generate time stamps indicating times at which impaired operator events occur.

16. The system of claim 15, further comprising a transceiver, wherein the processor is further configured to transmit proximity vector data and the time stamps corresponding to the impaired operator events to a remote server over a wireless network via the transceiver.

17. The system of claim 11, further comprising a transceiver, wherein the processor is further configured to generate an impairment notification and transmit the notification to the remote server over the wireless network for alerting an administrator that the operator may be operating the vehicle while impaired.

* * * * *